US010767288B2

(12) United States Patent
Provost et al.

(10) Patent No.: US 10,767,288 B2
(45) Date of Patent: Sep. 8, 2020

(54) PREFORM FOR A CURVED COMPOSITE STIFFENER FOR AN AXISYMMETRIC PART SUCH AS A COLLAR

(71) Applicant: SAFRAN NACELLES, Gonfreville l'Orcher (FR)

(72) Inventors: Benjamin Provost, Montivilliers (FR); Julien Lorrillard, Le Havre (FR); Bertrand Desjoyeaux, Sainte Adresse (FR); Michel Rognant, Le Havre (FR)

(73) Assignee: Safran Nacelles, Gonfreville l'Orcher (FR)

( * ) Notice: Subject to any disclaimer, the term of this patent is extended or adjusted under 35 U.S.C. 154(b) by 339 days.

(21) Appl. No.: 15/454,022

(22) Filed: Mar. 9, 2017

(65) Prior Publication Data
US 2017/0175308 A1    Jun. 22, 2017

Related U.S. Application Data

(63) Continuation of application No. PCT/FR2015/052404, filed on Sep. 10, 2015.

(30) Foreign Application Priority Data

Sep. 10, 2014 (FR) ..................... 14 58493

(51) Int. Cl.
*D03D 25/00* (2006.01)
*B29C 70/24* (2006.01)
(Continued)

(52) U.S. Cl.
CPC ............ *D03D 25/005* (2013.01); *B29B 11/16* (2013.01); *B29C 70/24* (2013.01); *D03J 1/00* (2013.01);
(Continued)

(58) Field of Classification Search
USPC .................. 428/107, 119, 193, 121; 442/206
See application file for complete search history.

(56) References Cited

U.S. PATENT DOCUMENTS

| 4,379,798 A | 4/1983 | Palmer |
| 4,467,838 A | 8/1984 | Rheaume |

(Continued)

FOREIGN PATENT DOCUMENTS

| FR | 2975735 | 11/2012 |
| WO | 2005/082605 | 9/2005 |
| WO | 2013/088040 | 6/2013 |

OTHER PUBLICATIONS

International Search Report for International Application PCT/FR2015/052404, dated Jan. 19, 2016.

*Primary Examiner* — Lynda Salvatore
(74) *Attorney, Agent, or Firm* — Burris Law, PLLC

(57) ABSTRACT

The present disclosure concerns a preform for a curved composite stiffener for an axisymmetric part such as a shroud, including at least one web and at least one flange curved about an axis of revolution of the preform and defining a substantially "T" or an "I" shaped section. In one form, the preform includes a web and a flange, wherein the web includes a plurality of warp yarns circumferentially oriented relative to the axis of revolution of the preform, and a plurality of weft yarns oriented radially relative to said axis, and the flange includes a plurality of warp yarns circumferentially oriented relative to the axis of revolution of the preform, and a plurality of weft yarns substantially parallel to said axis.

5 Claims, 7 Drawing Sheets

(51) Int. Cl.
*D03J 1/00* (2006.01)
*F01D 9/00* (2006.01)
*F01D 9/04* (2006.01)
*B29B 11/16* (2006.01)
*F01D 25/26* (2006.01)
*F01D 25/24* (2006.01)
*F01D 5/28* (2006.01)
*B29K 307/04* (2006.01)

(52) U.S. Cl.
CPC ............... *F01D 5/282* (2013.01); *F01D 9/00* (2013.01); *F01D 9/04* (2013.01); *F01D 25/24* (2013.01); *F01D 25/243* (2013.01); *F01D 25/246* (2013.01); *F01D 25/265* (2013.01); *B29K 2307/04* (2013.01); *D10B 2505/02* (2013.01); *Y02T 50/672* (2013.01)

(56) References Cited

U.S. PATENT DOCUMENTS

| | | | |
|---|---|---|---|
| 5,368,076 A | | 11/1994 | Curzio |
| 5,418,035 A | * | 5/1995 | Iguchi ................ B29C 53/04 |
| | | | 428/119 |
| 2008/0206048 A1 | | 8/2008 | Coupe |
| 2009/0202763 A1 | | 8/2009 | Rose |

\* cited by examiner

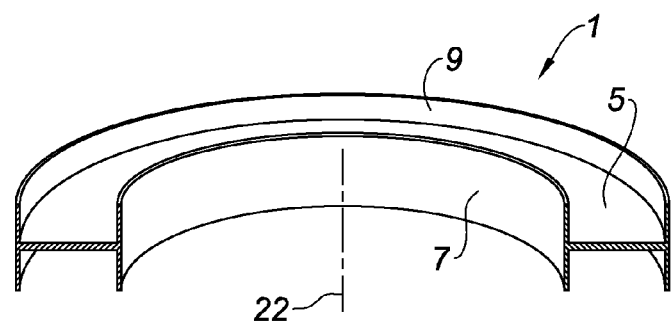
Fig. 7
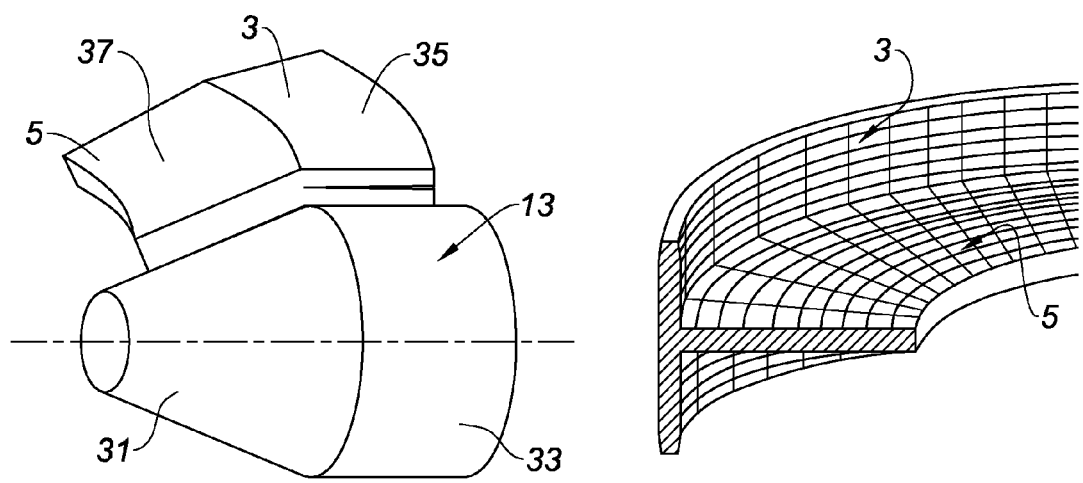
Fig. 8
Fig. 9
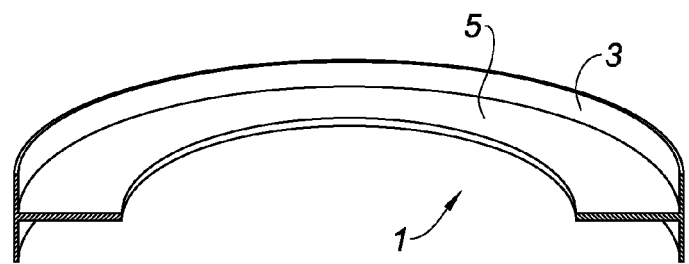
Fig. 10

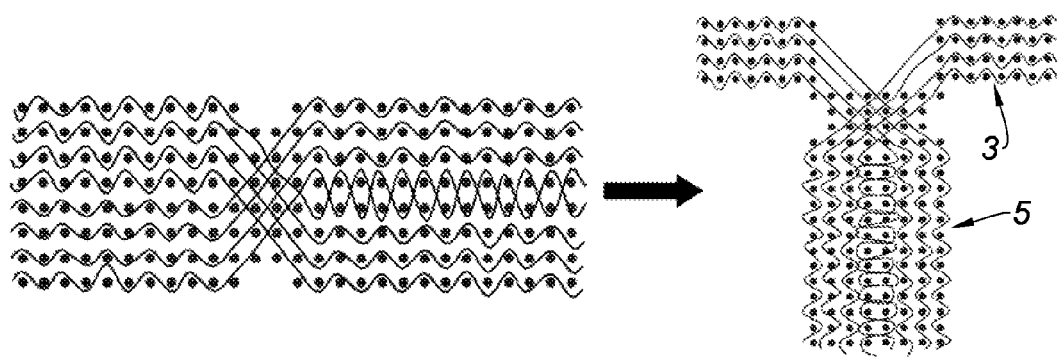
*Fig. 22*
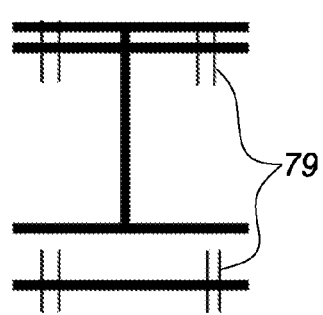
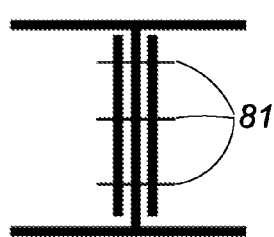
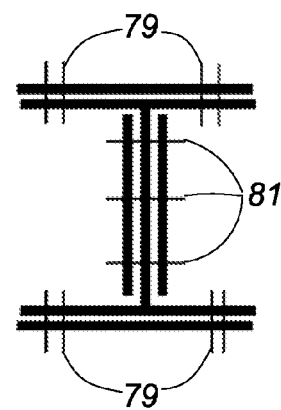
*Fig. 23*  *Fig. 24*  *Fig. 25*

PREFORM FOR A CURVED COMPOSITE STIFFENER FOR AN AXISYMMETRIC PART SUCH AS A COLLAR

CROSS-REFERENCE TO RELATED APPLICATIONS

This application is a continuation of International Application No. PCT/FR2015/052404, filed on Sep. 10, 2015, which claims priority to and the benefit of FR 14/58493 filed on Sep. 10, 2014. The disclosures of the above applications are incorporated herein by reference.

FIELD

The present disclosure relates to a preform for a curved composite stiffener, a stiffener obtained with such a preform and an axisymmetric part comprising such a stiffener, a method for manufacturing this preform and a take-up mandrel adapted to implement said method.

BACKGROUND

The statements in this section merely provide background information related to the present disclosure and may not constitute prior art.

In order to produce elements of resistant and lightweight structure, in particular for the aeronautical field, it is known to prepare a dry fabric preform comprising for example carbon fibers, which is impregnated with a resin, in particular by an injection method called "RTM" (Resin Transfer Molding).

Thus, after curing to polymerize the resin, there is obtained an element comprising fibers whose density and orientation are locally adjusted in order to obtain mechanical strength features adapted to the forces applied to this part.

In particular, it is possible to carry out, by means of this technique, a self-stiffened panel in the shape of a skin bent about an axis such as an axisymmetric shroud or an axisymmetric shroud sector, including at least one stiffener, at least partially circumferential, providing rigidity to this skin: such a skin may be used in particular in the manufacture of an aircraft motor nacelle.

In some cases, the stiffening function is ensured by an element having a constant transverse section with a substantially "T," "Π" (Pi), or "I" shape, comprising a web (the vertical portion of the T, Pi or I) and a flange (the extended base of the section of the T, Pi or I).

In order to produce the assembly formed by the bent skin to be stiffened and the stiffener, it is known to separately produce the skin and the stiffener which are pre-cured, then assembled by a mechanical link or a gluing.

Different methods for manufacturing curved stiffeners are known from the prior art.

A draping method of flat fabric remnants is known from the prior art, which consists in draping in the shape of the curved stiffener, flat fabric pleats. However, this operation requires a large workforce, which leads to significant draping time and manufacturing costs. Furthermore, many fabric remnants are required, and the orientation of the fibers is not optimized.

It is also known to drape fabric remnants in shape. This method consists in placing on the flange of the panel of the fabric remnants manufactured in the shape defining the web. The advantage of this method is the good control of the orientation of the fibers, but the obtained panel is mechanically weak because of the assembly of the different preforms which generate discontinuities in the fibrous reinforcement.

A method for cracking and stretching the fiber is also known from the international application WO 2005/082605. This method consists in producing a preform having the section of the final geometry then in cracking the fiber and in stretching some portions of this preform in order to give it a curved shape. However, neither the cracking method of the fiber, nor the stretching method of the preform in order to give it its curved shape can be uniform over the assembly of the woven preform. Also, the fact of breaking the continuity of the carbon fiber considerably weakens the mechanical properties of the manufactured part.

The international application WO 2013/088040 discloses, for its part, a 3D weaving method by which a three-dimensional preform having localized unbinding zones is obtained, allowing the unfolding of the preform in order to give it its "T," "Π" (Pi), or "I" shaped section. Nevertheless, these preforms have the drawback of being straight and not being able to conform to a curvature.

SUMMARY

The present disclosure provides a curved dry textile preform with a "T," "Pi" or "I" shaped section, inexpensive to manufacture and improved relative to the stresses to which it is intended to be subjected.

The present disclosure provides a preform for a curved composite stiffener for axisymmetric part such as a shroud, comprising at least one web and at least one flange curved about an axis of revolution of said preform and defining a substantially "T" or "I" shaped section, said preform being noteworthy in that:

the web comprises a plurality of warp yarns circumferentially oriented relative to the axis of revolution of the preform, and a plurality of weft yarns radially oriented relative to said axis, and the flange comprises a plurality of warp yarns circumferentially oriented relative to the axis of revolution of the preform, and a plurality of weft yarns substantially parallel to said axis.

An advantage of this woven preform is that there is obtained, in a single, easily industrializable and rapid operation, a continuous weaving of the web and the flange of the preform, which are then positioned on a tooling with the geometry of the final part including a shape holding device of the web of the stiffener such as a core or counter-shape and bladder tooling, foam shaped etc., then impregnated with a resin, in order to constitute, after curing, a homogeneous assembly.

In the same manner, the obtained stiffener preform may be directly injected with resin then integrated into the support to which the stiffener preform is assembled, which allows limiting the number of manipulation of the preform, and consequently improving the manufacturing cost and time of the axisymmetric part.

According to a feature of the preform according to the present disclosure the web comprises a binding zone of warp yarn layers to each other due to weft yarns, and the at least one flange comprises at least one unbinding zone of warp yarn layers. Moreover, the warp yarns of the flange of the preform have identical lengths, (wherein "identical lengths" should be construed to be substantially the same within manufacturing tolerances) and the warp yarns of the web of the preform have varied lengths.

The present disclosure also provides a curved composite stiffener for an axisymmetric part such as a shroud, comprising at least one preform according to the present disclosure; an axisymmetric part such as a shroud, reinforced by at least one stiffener according to the present disclosure.

The present disclosure also provides a method for manufacturing a preform for curved composite stiffener for axisymmetric part such as a shroud, said preform having at least one web and at least one flange and defining a substantially "T" or "I" shaped section, said method being noteworthy in that said preform is produced by a contour-type shape weaving method, and in that it comprises the following steps: taking up the warp yarns directly from the output of a loom on a take-up mandrel having at least one conical portion and at least one conical or cylindrical portion; inserting weft yarns so as to define at least one binding zone and at least one unbinding zone of the warp yarn layers; unfolding the obtained preform so as to obtain said web and said at least one flange. Thus, by providing for using a contour-type shape weaving method for producing a stiffener preform with a "T" or "I" shaped section, the preform is given the desired curvature directly at the output of the loom.

Furthermore, the present disclosure provides a preform having a web and a flange intimately connected and is obtained without having to attach the web to the flange, conferring on the obtained part excellent mechanical properties, improving the mechanical properties obtained by the manufacturing methods known from the prior art.

Moreover, the present disclosure provides a woven preform obtained in a single operation which may be easily industrializable and rapid, a continuous weaving of the web and the flange of the preform which are then positioned on a tooling with the geometry of the final part including the shape holding device of the web of the stiffener, such as a core or counter-shape and bladder tooling, foam shaped, etc., then impregnated with a resin, in order to constitute, after curing, a very homogeneous assembly.

The stiffener preform of the present disclosure may be directly injected with resin then integrated into the support to which it should be assembled, which allows limiting the number of manipulations of the preform, reducing the manufacturing cost and time of the axisymmetric part.

The present disclosure also concerns a take-up mandrel adapted to implement the manufacturing method according to the present disclosure, noteworthy in that it has a non-rectilinear generatrix.

Furthermore, the take-up mandrel according to the present disclosure comprises at least one conical portion and at least one conical or cylindrical portion.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 7 represents schematically the stiffener obtained by the preform with an "I" shaped section;

FIGS. 8 to 10 are figures similar to FIGS. 3, 6, and 7, the illustrated preform having a "T" shaped section, the web of the preform being located inside the flange;

FIGS. 16 to 22 represent schematically weaving variants of the "I" shaped preform;

FIGS. 23 to 25 illustrate another variant for manufacturing the preform.

Figure 1A:
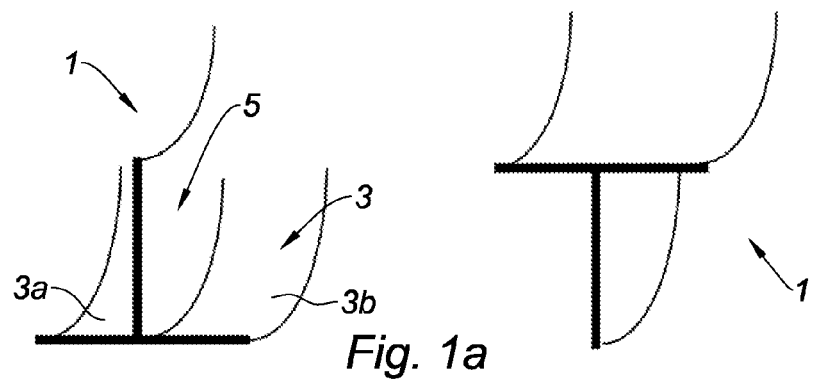
FIGS. 1a and 1b illustrate two stiffeners obtained by the manufacturing method of the preform according to the present disclosure, having respectively a "T" shaped section or an "I" shaped section.

In all the figures, identical or similar references represent identical or similar members or assemblies of members.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the present application, the term "axisymmetric part supporting a stiffener" means any part whose three-dimensional geometrical definition concerned by the stiffener and its integration with the part may be defined by a 2D section contained in a plane, and by an axis contained in this plane and not intercepting said 2D section, about which the 2D section is rotated in order to obtain, according to a given angular sector, an axisymmetric shroud sector, or a complete shroud in the case where the angular sector has an angle of 360°.

Reference is made to FIG. 1a representing a stiffener 1 obtained by the method according to the present disclosure, having substantially a "T" shaped section, bent about an axis.

The weaving method according to the present disclosure uses a contour-type shape weaving method known from the prior art, a method consisting in winding the fibrous preform during weaving directly at the output of the loom, on a cylinder called rotary take-up mandrel.

In the represented example, the stiffener has a flange 3 comprising two portions 3a, 3b, connected to each other by a web 5 of the stiffener 1.

Figure 1B:
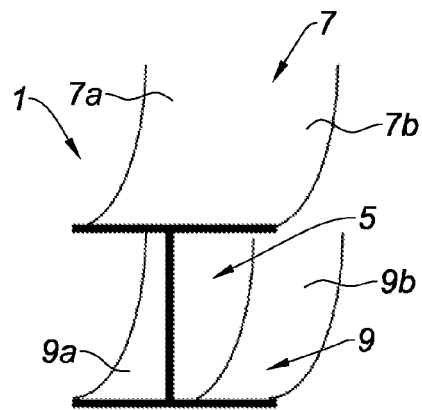

In FIG. 1b, the stiffener 1 has a substantially "I" shaped section, that is to say that the stiffener has two flanges 7, 9, each of the flanges comprising two portions 7a, 7b and 9a, 9b, connected to each other by a web 5.

Figure 2:
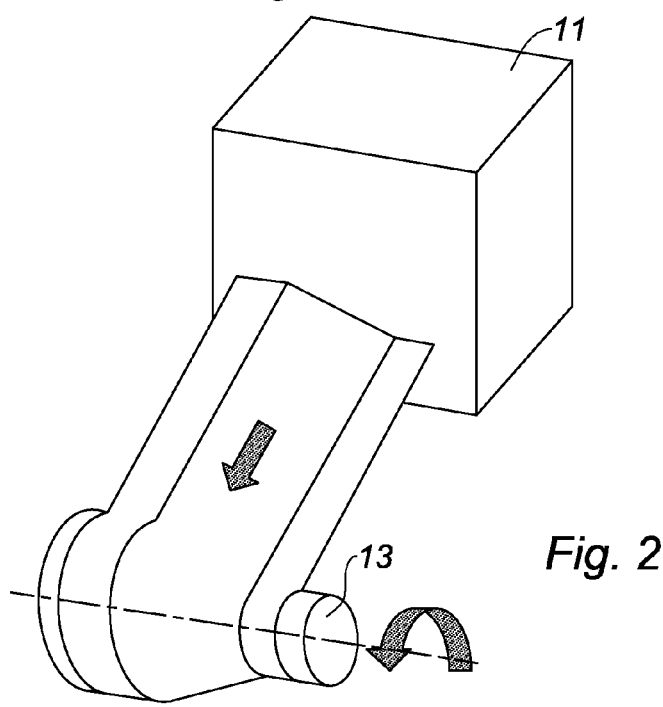
FIG. 2 represents the preform during weaving by a manufacturing method according to the present disclosure.

FIG. 2 represents a loom 11 which continuously produces the preform, conforming to a take-up mandrel 13 for manufacturing a preform with an "I" shaped section.

Figure 3:
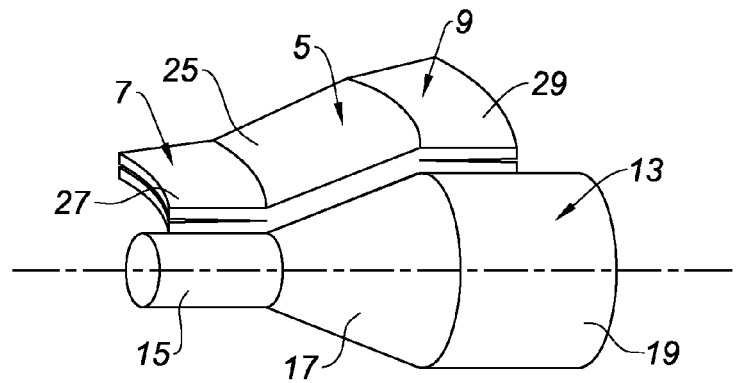
FIG. 3 is a detailed view of FIG. 2 which illustrates a preform with an "I" shaped section during manufacturing.

As visible in more details in FIG. 3, illustrating the preform during weaving on the take-up mandrel 13, the mandrel 13 according to the present disclosure has a first cylindrical portion 15, a second conical portion 17 and a third cylindrical portion 19, with a diameter greater than the first cylindrical portion 15. Thus, the take-up mandrel 13 according to the present disclosure has a non-rectilinear generatrix, which may have points of inflection. This particular geometry of the take-up mandrel 13 enables non-uniformly consuming the warp yarns. Indeed, the quantity of warp yarns taken-up on the mandrel is dependent on the considered section of the take-up mandrel. The greater the transverse section of a mandrel portion is, the greater the number of warp yarns taken-up during a rotation of the mandrel will be. In other words, the furthest points of a generatrix of the mandrel from the axis of revolution of the mandrel take-up at each rotation of the mandrel a greater quantity of warp yarns relative to the points of said generatrix which are closer to the axis of revolution of the mandrel.

The first and third portions 15 and 19, being cylindrical, have a profile enabling the production of the two flanges 7 and 9 of the preform.

The second portion 17, being conical, has a profile enabling the production of web 5 of the preform according to the desired curvature.

According to the present disclosure, the loom continuously provides warp yarns directly taken-up on the mandrel 13 directly located at the output of the loom 11.

Figure 4:
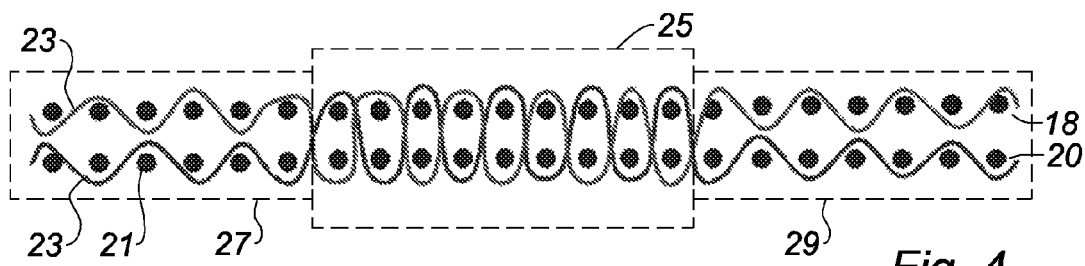
FIG. 4 represents a section of the preform of FIG. 3 at the output of the loom.

Weft yarns are inserted between the warp yarns as and when the warp yarns move forward by being taken-up on the mandrel by the contour-type shape weaving method, according to a weaving pattern defining binding zones and unbinding zone of warp yarn layers, as represented in FIG. 4 to which reference is now made.

As represented in this figure, two layers 18, 20 of warp yarns 21 coming from the loom are directly taken-up by the mandrel, and weft yarns 23 are inserted between the warp yarns as the warp yarns are taken-up on the mandrel, so as to define a binding zone 25 of the warp yarn layers 21 to each other by the weft yarns 23 and two unbinding zones 27, 29 of the warp yarn layers.

For a better understanding of the present disclosure, these binding 25 and unbinding 27, 29 zones are represented in FIG. 3 illustrating the preform during weaving, on the take-up mandrel 13.

Figure 5:
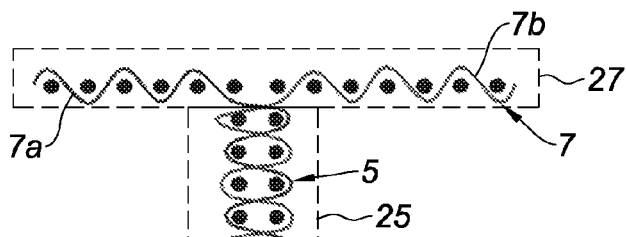
FIG. 5 illustrates a section of the preform of FIG. 4, in the unfolded position.

The binding zones 25 constitute, once the preform is unfolded, represented in FIG. 5, the web 5 of the preform, while the unbinding zones 27, 29 constitute respectively, once the preform is unfolded, the two flanges 7 and 9 of the preform, each comprising the two portions 7a, 7b and 9a, 9b.

Figure 6:
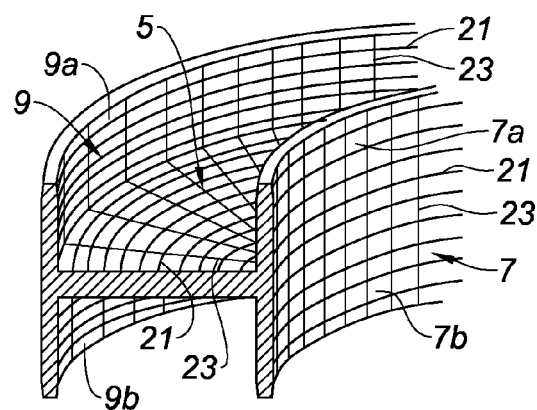
FIG. 6 is a partial isometric view of the preform represented in FIG. 5.

Referring to FIG. 6, it is noteworthy that the preform according to the present disclosure obtained by contour-type shape weaving is advantageously curved, directly at the output of the loom, due to the take-up mandrel.

The web 5 of the preform comprises a plurality of warp yarns 21 circumferentially oriented relative to an axis of revolution 22 of the preform, and a plurality of weft yarns 23 radially oriented relative to said axis.

The flanges 7 and 9 comprise, for their part, a plurality of warp yarns circumferentially oriented relative to the axis of revolution 22 of the preform, and a plurality of weft yarns 23 parallel to said axis of revolution.

These particular orientations of the weft yarns and the warp yarns of the web and of the flanges of the preform are obtained due to the non-rectilinear generatrix of the take-up mandrel, enabling the production of a preform according to the present disclosure having different lengths of warp yarns in the zone of the web and in the zone of the flanges. As represented in FIG. 6, the warp yarns 21 which constitute the flange 7 all have identical lengths, as well as the warp yarns which constitute the flange 9, while the warp yarns which constitute the web 5 of the preform have different lengths.

The obtained dry preform, composed of dry carbon fibers, may then be impregnated with a resin, for example by any of the impregnation methods grouped under the name Liquid Composite Molding (LCM) known per se. This preform impregnated with resin is then placed in a curing furnace, in order to polymerize the resin.

The polymerization step concludes the manufacture of the stiffener 1 according to the present disclosure, represented schematically in FIG. 7.

The obtained stiffener comprises a web 5 and two flanges 7 and 9, and is intended to be mounted on a shroud which may define a nacelle portion for a turbojet engine, and may, to this end, be assembled to a pre-cured bent skin defining the shroud, by mechanical link or by gluing.

The dry preform, composed of dry carbon fibers may also be assembled to a skin composed of fibers which are also dry so that the preforms of the skin and of the stiffener are impregnated with resin during a same impregnation operation, enabling the manufacture of a self-stiffened shroud. In the same manner, the polymerization step concludes the manufacture of the self-stiffened bent skin according to the present disclosure.

Referring now to FIGS. 8 to 10, illustrating a preform with a "T" shaped section called concave, that is to say that the web of the stiffener with a "T" shaped section is disposed inside the curved flange, that is to say that the web is radially closer than the flange relative to the axis of revolution of the preform. As defined in FIG. 1a, a stiffener with a "T" shaped section has a web 5 and a single flange 3 comprising two portions 3a, 3b. Such a stiffener with a "T" shaped section may comprise a web 5 inside the concave flange 3, as represented in FIG. 10. The stiffener with a "T" shaped section comprising a web 5 inside the flange 3 illustrated in this figure is obtained by the method for manufacturing the preform with a "T" shaped section represented in FIGS. 8 and 9, the figures similar to FIGS. 3 and 6 representing the preform with an "I" shaped section.

As visible in more details in FIG. 8, illustrating the preform during weaving on the take-up mandrel 13, the mandrel 13 has now a first conical portion 31 and a second cylindrical portion 33.

The first portion 31, being conical, has a profile enabling the production of the web 5 of the preform according to the desired curvature.

The second portion 33, being cylindrical, has a profile enabling the production of the flange 3 of the preform with a substantially "T" shaped section. To this end, the weaving pattern of the preform provides for producing an unbinding zone 35 of the warp yarn layers, produced at the cylindrical portion 33 of the take-up mandrel 13, while a binding zone 37 is carried out on the conical portion 31 of the take-up mandrel.

Figure 11:
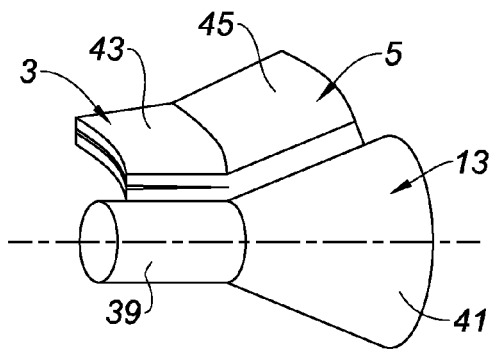
FIGS. 11 to 13 are figures similar to FIGS. 8 to 10, the web of the preform with a "T" shaped section being located outside the flange.
Figure 12:
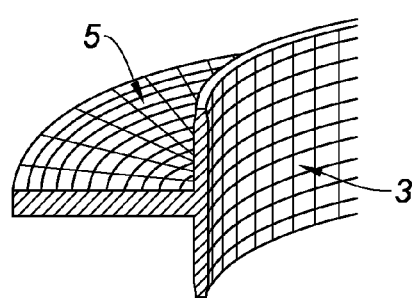
Figure 13:
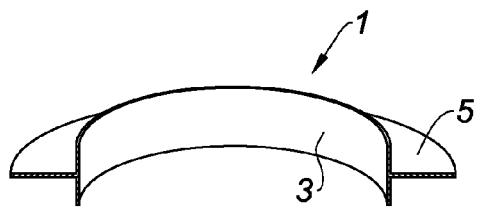

FIGS. 11 to 13, to which reference is now made, are similar to FIGS. 8 to 10, the produced preform being convex, that is to say that the web of the stiffener with a "T" shaped section is disposed outside the curved flange, that is to say that the web is radially further than the flange, relative to the axis of revolution of the preform.

As represented in FIG. 11, the mandrel 13 now comprises a first cylindrical portion 39 and a second conical portion 41.

The second portion 41, being conical, has a profile enabling the production of web 5 of the preform according to the desired curvature.

The first portion 39, being cylindrical, has a profile enabling the production of flange 3 of the preform with a substantially "T" shaped section. To this end, the weaving pattern of the preform provides for producing an unbinding zone 43 of the warp yarn layers, carried out at the cylindrical portion 39 of the take-up mandrel 13, while a binding zone 45 is produced on the conical portion 41 of the take-up mandrel.

Figure 14:
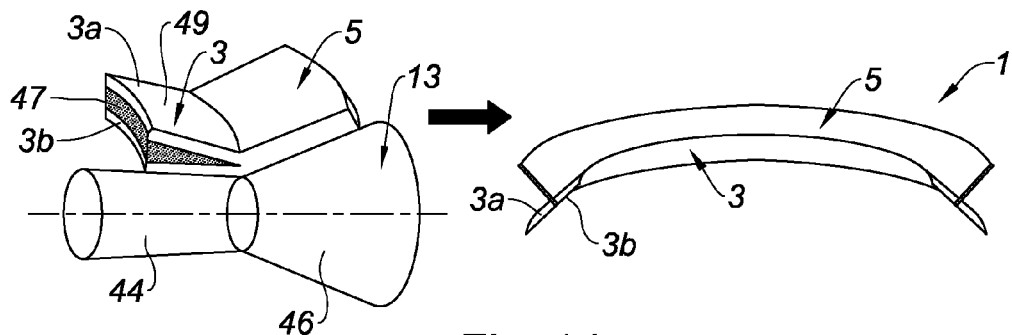
FIG. 14 illustrates a variant for manufacturing a preform with a "T" shaped section, the web of the preform being located outside the flange.

According to a variant represented in FIG. 14, representing the preform during weaving on the take-up mandrel 13 and the stiffener 1 obtained by this preform, the stiffener 1 may have an inclination at the flange.

This inclination is obtained due to a particular geometry of mandrel 13, having two conical portions 44, 46, and due to a core 47 which is positioned during the weaving in the unbinding zone 49 of the warp layers, between the two portions 3a, 3b intended to constitute the flange 3. The two conical portions 44 and 46 of the mandrel as well as the core 47 enable creating differences in consumption at the warp yarns taken-up on the mandrel. These consumptions result in different lengths of the warp yarns composing the assembly of the preform and thus generating different curvatures for the different portions of the preform, namely: the first portion 3a of the flange, the second portion 3b of the flange, and the web 5.

This type of stiffener is particularly adapted to the outer portion of a convex conical surface.

Figure 15:
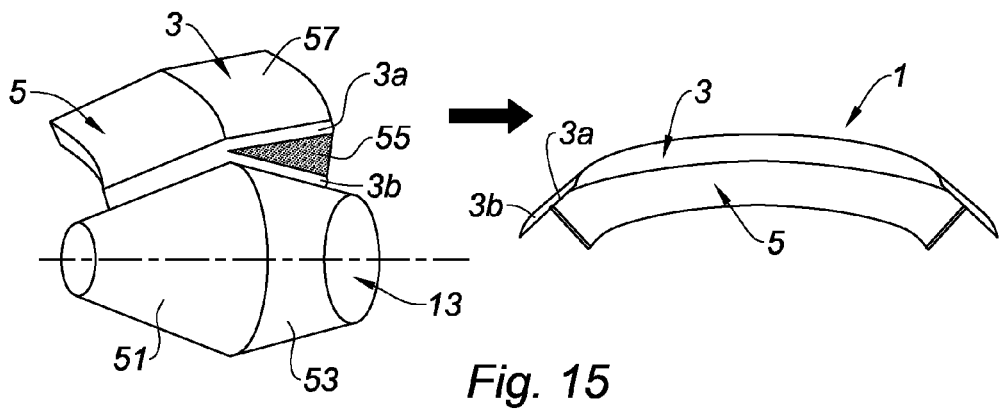
FIG. 15 is a view similar to FIG. 14, the web of the preform being located inside the flange.

In a variant represented in FIG. 15, the stiffener 1 is particularly suitable for the inner portion of a concave conical surface. To this end, a mandrel 13 having two conical portions 51, 53 is used, and a core 55 is positioned during the weaving in the unbinding zone 57 of the of warp yarn layers, between the two portions 3a, 3b intended to constitute the flange 3.

The weaving mode of the preform, illustrated in FIG. 4, represents two warp yarn layers in the web of the preform, and a warp yarn layer in the flange of the preform.

This weaving mode constitutes a non-limiting example of the envisaged weaving, and several weaving variants are envisaged, represented in FIGS. 16 to 22. Of course, the present disclosure is not limited to these binding modes, only given by way of examples.

Figure 16:
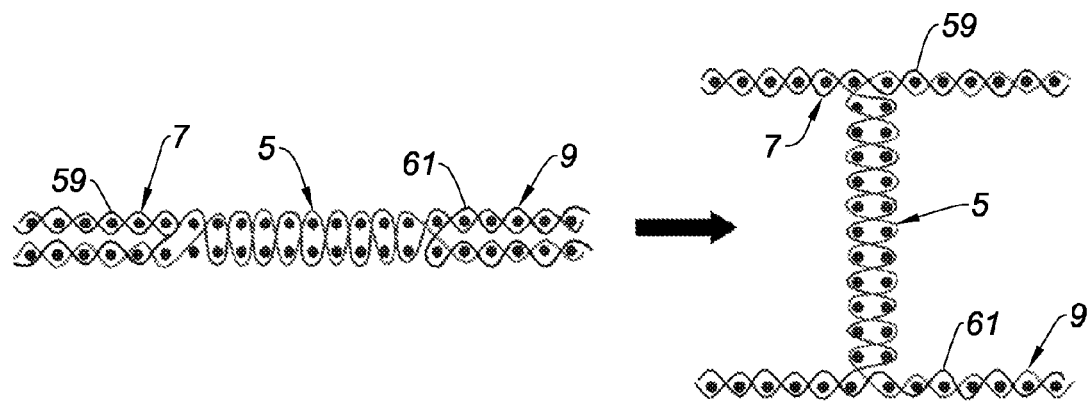

As illustrated in FIG. 16, it is in particular possible to introduce two additional weft yarns 59, 61 at the flanges 7 and 9 in order to produce an additional localized binding at the meeting point of the pleats of the flange, which enables reinforcing the junction between the web 5 and the flanges 7, 9.

FIGS. 17 to 20 illustrate a variant according to which a single warp yarn layer is provided in the web and in the flange of the preform.

Figure 17:
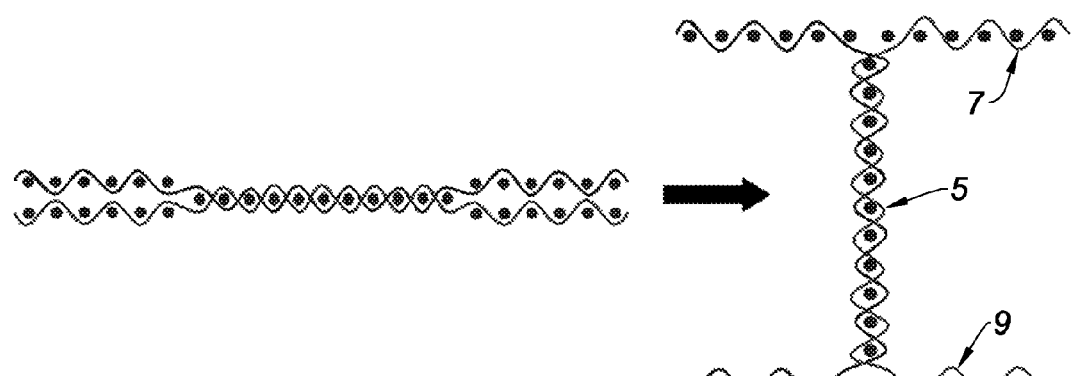

In FIG. 17, the preform has a constant density of warp yarns in the web and in the flange.

Figure 18:
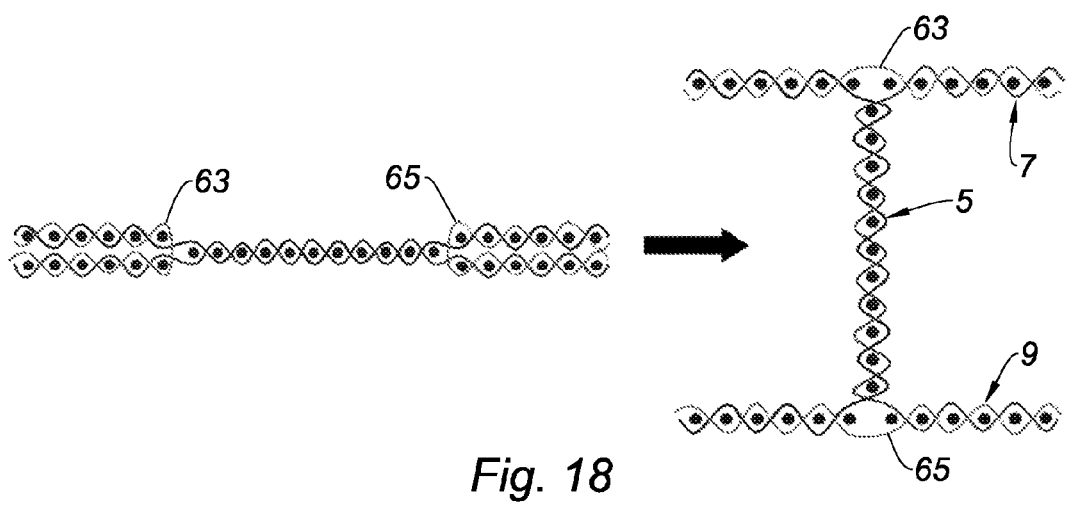

FIG. 18 is a variant of the preform represented in FIG. 17, according to which two additional weft yarns 63, 65 are introduced at the flanges 7 and 9 in order to produce an additional localized binding at the meeting point of the pleats of the flange, which enables reinforcing the junction between the web 5 and the flanges 7, 9.

Figure 19:
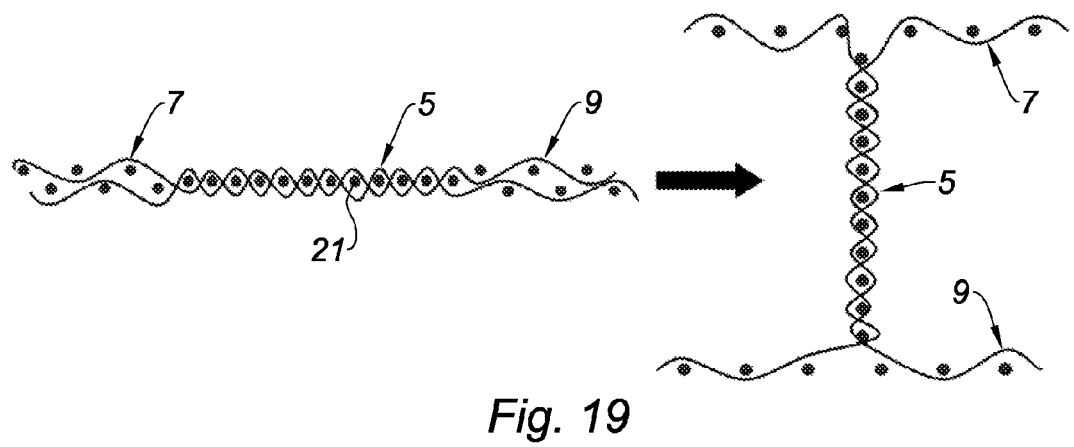

In the variant represented in FIG. 19, the web 5 has a density of warp yarns 21 greater than in the preceding variants. This variant has the particularity of being carried out from a uniform warp yarn layer in the reed of the loom.

Figure 20:
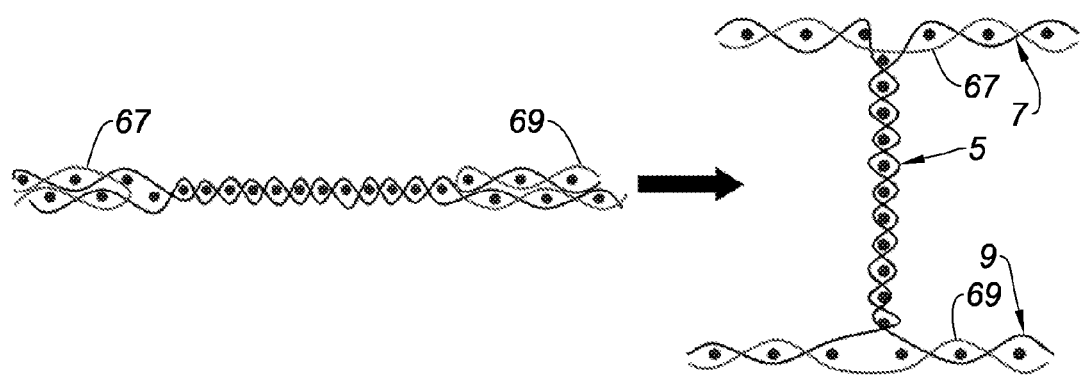

FIG. 20 illustrates a variant of the weaving of FIG. 19, in which two additional weft yarns 67, 69 are inserted at the flanges 7 and 9 in order to produce an additional localized binding at the meeting point of the pleats of the flange, which enables reinforcing the junction between the web 5 and the flanges 7, 9.

Figure 21:
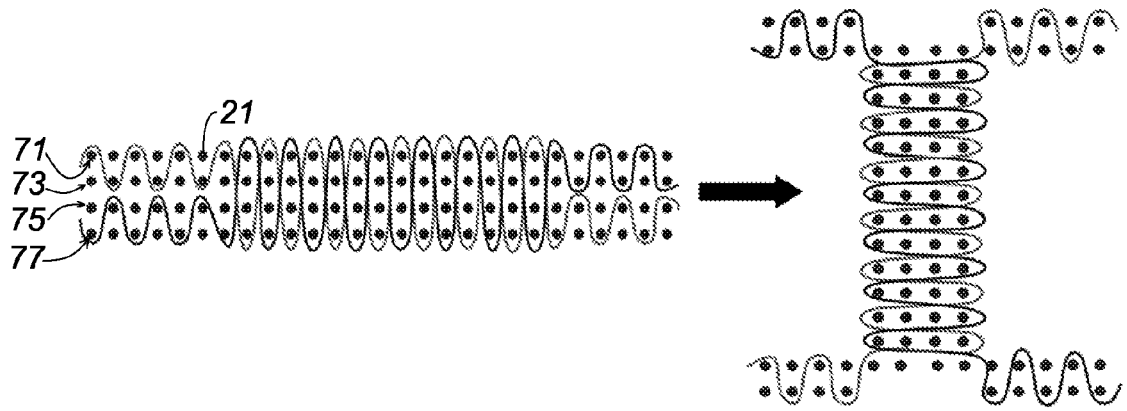

The weaving variants represented in FIGS. 21 and 22 illustrate a woven preform from a plurality of warp yarn layers in the web 5 and in the flanges 7 and 9.

In FIG. 21, four layers 71, 73, 75, 77 of warp yarns 21 are represented. Of course, the number of layers as well as the binding mode thereof is not limited to the representation of this figure.

In a variant represented in FIG. 22, the "T" shaped section preform has a particular binding mode improving the management of the forces at the junction zone between the web 5 and the flange 3.

According to a common variant to the previously described weaving modes, it is envisaged to add fabric pleats 79 at the flanges and/or of the fabric pleats 81 at the web of the preform, as represented in FIGS. 23 to 25.

Thanks to the present disclosure, the mechanical performance of the stiffeners with a "T" or "I" shaped section are improved relative to the performance obtained by the methods used in the prior art. Indeed, due to the manufacturing method according to the present disclosure, the assembly of the preform, that is to say the web and the one or more flange(s), are manufactured in one piece, which enables obtaining an intimate connection between the web and the one or more flange(s) of the stiffener.

Thanks to the manufacturing method of the preform by contour-type shape weaving, the orientation of the fibers of the preform is controlled and optimized. Indeed, the obtained stiffener is directly adapted to the curvature of the support on which it is assembled, without any intermediate operation aiming to give it its specific curvature, which reduces the number of manipulations on the preform. Thus, the manufacturing cost of a shroud equipped with such a stiffener is advantageously reduced relative to the prior art.

Furthermore, the contour-type shape weaving method constitutes a technical solution, repeatable and uniform, in terms of orientation of the fibers, and thus enables reducing the manufacturing time and cost and improving the mechanical performance.

Finally, it goes without saying that the present disclosure is not limited to the forms obtained by the method according to the present disclosure, described above only by way of illustrative examples, but it encompasses, on the contrary, all variants involving the technical equivalents of the described means as well as the combinations thereof if said combinations fall within the scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A preform for a curved composite stiffener for an axisymmetric part comprising at least one web and at least one flange curved about an axis of revolution of said preform and defining at least one of a "T" and an "I" shaped section, wherein:

the at least one web comprises a plurality of warp yarns circumferentially oriented relative to the axis of revolution of the preform to define web warp yarn layers, and a plurality of weft yarns oriented radially relative to said axis of revolution, wherein the weft yarns are inserted between the warp yarns so as to define a binding zone of the warp yarn layers to each other by the weft yarns; and the at least one flange comprises a plurality of warp yarns circumferentially oriented relative to the axis of revolution of the preform to define flange warp yarn layers, and a plurality of weft yarns parallel to said axis of revolution to define an unbinding zone in which the flange warp yarn layers are not bound by the weft yarns.

2. The preform according to claim 1, wherein the plurality of warp yarns of the at least one flange of the preform have identical lengths, and the plurality of warp yarns of the web of the preform have varied lengths.

3. A curved composite stiffener for an axisymmetric part comprising at least one preform according to claim 1.

4. An axisymmetric part reinforced by at least one stiffener according to claim 3.

5. A method for manufacturing the preform according to claim 1, said method comprising the following steps:

taking-up the warp yarns directly out of a loom onto a take-up mandrel having at least one conical portion and at least one of a conical and a cylindrical portion;

inserting the weft yarns so as to define the binding zone and the unbinding zone of warp yarn layers; and unfolding an obtained preform to obtain said at least one web and said at least one flange.

* * * * *